United States Patent [19]

Brake et al.

[11] Patent Number: 5,734,253
[45] Date of Patent: Mar. 31, 1998

[54] MULTIPLE STATION CHARGING APPARATUS WITH STORED CHARGING ALGORITHMS

[75] Inventors: Clifford Brake, Wadsworth; Lee Leppo, Tallmadge; Steven Smithberger, Canton, all of Ohio

[73] Assignee: Telxon Corporation, Akron, Ohio

[21] Appl. No.: 686,576

[22] Filed: Jul. 26, 1996

[51] Int. Cl.⁶ ............................................. H01M 10/46
[52] U.S. Cl. .................... 320/6; 320/15; 320/22; 320/30
[58] Field of Search ................... 320/5, 6, 7, 15, 320/16, 17, 30, 39, 2, 21, 22

[56] References Cited

U.S. PATENT DOCUMENTS

| | | | |
|---|---|---|---|
| 3,852,652 | 12/1974 | Jasinski | 320/35 |
| 3,867,681 | 2/1975 | Bishop et al. | 320/21 |
| 3,895,283 | 7/1975 | Peterson | 320/35 |
| 4,433,277 | 2/1984 | Carollo et al. | 320/15 X |
| 4,727,306 | 2/1988 | Misak et al. | 320/35 |
| 5,057,762 | 10/1991 | Goedken et al. | 320/15 |
| 5,119,008 | 6/1992 | Morita et al. | 320/15 X |
| 5,121,047 | 6/1992 | Goedken et al. | 320/39 |
| 5,122,722 | 6/1992 | Goedken et al. | 320/39 X |
| 5,166,596 | 11/1992 | Goedken | 320/24 X |
| 5,180,962 | 1/1993 | Giancaterino et al. | 320/35 |
| 5,187,422 | 2/1993 | Izenbaard et al. | 320/15 X |
| 5,343,137 | 8/1994 | Kitaoka et al. | 320/13 |
| 5,561,361 | 10/1996 | Sengupta et al. | 320/35 X |

OTHER PUBLICATIONS

P. 41 of an unknown publication describing various charging methods including cell voltage detection for charging cells, date unknown.

Sixteen page product specification No. LT1511 published by Linear Technology, "Constant–Current/Constant–Voltage 3A Battery Charger with Input Current Limiting", published Oct., 1995.

*Primary Examiner*—Edward Tso
*Attorney, Agent, or Firm*—Watts, Hoffmann, Fisher & Heinke Co., L.P.A.

[57] ABSTRACT

A charging apparatus with multiple charge stations is disclosed. The apparatus includes a single power supply which operates under the control of a microprocessor to charge a plurality of battery packs disposed in respective charging stations. Associated with each charging station is a wiring harness assembly which includes an EEPROM memory chip having one or more stored charging algorithms for the type or types of battery packs to be charged at that charging station. The microprocessor reads the charging algorithm from a charging station's memory chip when a battery pack is inserted in the charging station. The microprocessor utilizes a feedback control loop including a resistor network to regulate the charging current and charging voltage supplied to each battery pack being charged.

14 Claims, 7 Drawing Sheets

MULTIPLE STATION CHARGING APPARATUS WITH STORED CHARGING ALGORITHMS

FIELD OF THE INVENTION

This invention relates to a rechargeable battery pack charging apparatus having a plurality of charging stations and, more particularly, to a charging apparatus adapted to read battery pack charging algorithms from memory devices associated with each of the charging stations and concurrently charge a plurality of lithium-ion battery packs utilizing a single charging power supply.

BACKGROUND OF THE INVENTION

Rechargeable battery packs comprising one or more rechargeable battery cells are widely used to supply power to a variety of portable electronic devices. Rechargeable battery packs save the purchaser of a device the cost of continuously purchasing replacement batteries over the useful life of the device. Additionally, environmental concerns relating to disposal of non-rechargeable batteries also point to an increasing use of rechargeable battery packs in the future. A number of chemical compositions have been proposed for rechargeable battery cells including nickel-cadmium (Ni—Cd), lithium-ion (Li—Ion) and nickel-metal hydroxide (sometimes referred to as nickel-metal hydride) (Ni—MH).

Presently, there are battery charging apparatuses with multiple charging stations or charging bays capable of charging a plurality of Ni—Cd 1.5 volt battery cells. Typical charging apparatuses have a single charging power source or supply and sequentially charge the plurality of Ni—Cd battery cells disposed in respective charging stations. This sequential charging method is efficient because Ni—Cd battery cells accept a very rapid charge, that is, if the charger power source can provide enough charging current, an Ni—Cd battery cell can be charged in 15 to 20 minutes.

More expensive Ni—Cd charging apparatuses include a separate charging power supply for each of the charging stations. Conceptually, such chargers can be thought of as a plurality of individual chargers supported in a single housing. Multiple power supplies permit simultaneous charging of a cell at each charging station thereby reducing total charging time for charging a plurality of Ni—Cd cells. The major disadvantage of such charging apparatuses is the increased expense is associated with providing the plurality of power supplies.

Li—Ion battery cells have proven to be very efficient in terms of watt-hours per unit volume of the cell and high output voltage generated by the cell. Additionally, Li—Ion cells exhibit a long useful life. Thus, battery packs comprising one or more Li—Ion battery cells have found increasing use in a variety of portable electronic devices requiring a compact, higher voltage power supply. For example, the Model No. 18650 Li—Ion battery cell available from Moil Energy of Maple Ridge, British Columbia, Canada has a 4.1 volt output voltage potential when the cell is fully charged. The cell is considered discharged when the output voltage potential drops to 2.5 volts. During charging of a Li—Ion battery cell, the charging current through the cell must be limited. In the case of the Moli Energy Li—Ion cell, charging current must be limited to a maximum of 1.2 amps, otherwise damage to the cell may result.

In typical applications, two Li—Ion battery cells are disposed in a casing and electrically coupled in series to form a rechargeable Li—Ion battery pack. The battery pack is sized to fit in a battery pack receiving opening of an electronic device. During use of the device, the battery pack gradually discharges as it supplies power to electronics of the device. When the power supplied by the pack falls below a threshold value, the pack is removed from the device and recharged using a recharging apparatus.

Figure 1:
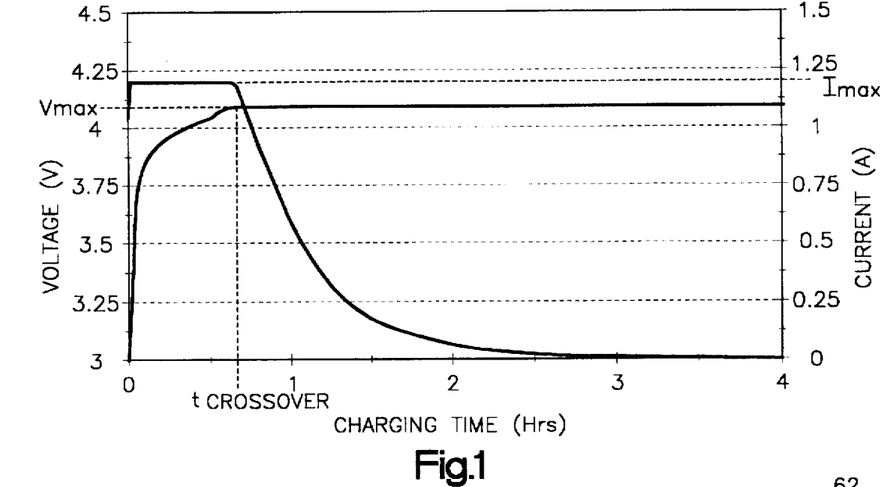
FIG. 1 is a graph showing the charging characteristics of a typical Li—Ion battery cell.

A discharged Li—Ion battery cell has a very low charging impedance. Therefore, when such a cell is first inserted or docked in a charging station of a charging apparatus, the charging current, $I_{charge}$, must be limited to a maximum charging current, $I_{max}$, for that cell to avoid damaging the cell. This is shown in FIG. 1 which plots the charging voltage across a typical Li—Ion battery cell, $V_{charge}$, and charging current through the cell, $I_{charge}$, over the time period from t=0 (start of charging) to t=$t_{crossover}$. During the period t=0 to t=$t_{crossover}$, $I_{charge}$=$I_{max}$ and the low cell charging impedance results in the charging voltage across the cell being significantly less than the maximum rated output voltage, $V_{max}$, of the cell, i.e., $V_{charge} \ll V_{max}$. During the charging process, chemical reactions within the Li—Ion cell cause the internal impedance of the cell to increase. As the cell charging impedance increases, the charging voltage, $V_{charge}$, will increase proportionately with cell charging impedance until the $V_{charge}$=$V_{max}$. The time required for the charging voltage to reach $V_{max}$ is referred to as the crossover time, $t_{crossover}$.

After $t_{crossover}$ is reached, the charging apparatus limits $V_{charge}$ to $V_{max}$ to avoid damaging the cell. Since the cell internal impedance continues to increase at a decreasing exponential rate as the cell charges, $I_{charge}$ decreases exponentially as shown in FIG. 1 until the cell is fully charged. For a typical Li—Ion 4.1 volt cell, $t_{crossover}$ is achieved after about 45 minutes while full charging requires about four hours.

In order to minimize total charging time for a rechargeable battery pack, the charging apparatus must provide as much charging power as possible during the charging time while making sure that the $I_{max}$ limit for the battery pack is not exceeded during the period from t=0 to t=$t_{crossover}$. For a battery pack comprising two typical Li—Ion cells electrically connected in series, the values for $I_{max}$ and $V_{max}$ are 1.2 amps and 8.2 volts respectively.

While it is desirable to have a multiple charging station charging apparatus utilize a single power supply to simultaneously charge a plurality of battery packs in parallel, control of the charging process becomes more complex. With battery packs being charged in parallel, the charging apparatus must identify the type of battery pack being charged, monitor the voltage of and the current through each battery pack and appropriately adjust the charging power supplied to each battery pack to minimize total charging time and not exceed the $I_{max}$ limit for any of the battery packs. For example, if one battery pack is completely discharged and the other battery packs in the charging stations are partially charged and if equal power is applied to all the stations, the discharged pack, if electrically coupled to the other packs, will draw power from the other packs during the charging process and, thus, the $I_{max}$ limit for the discharged pack may be exceeded.

There is a need to have a multiple charging station charging apparatus which utilizes a single power source or supply to simultaneously charge a plurality of Li—Ion battery packs positioned in the charging stations such that charging time for all battery packs is minimized and the $I_{max}$ limit of each battery pack is not exceeded. There is also a need for a multiple charging station charging apparatus which uses a single power supply to charge both Ni—Cd and Li—Ion battery cells which may be interchangeably inserted for charging in any of the charging stations.

SUMMARY OF THE INVENTION

A charging apparatus including multiple charging stations for simultaneously charging a plurality of battery packs disposed in respective charging stations using a single power source of supply is disclosed. Stored in a memory device such as an EEPROM integrated circuit (electrically erasable programmable read-only memory) chip of each charging station is one or more charging algorithms suitable for charging the type or types of battery packs to be charged in that charging station. The apparatus utilizes the charging station charging algorithms and a feed back control system to control charging voltage and charging current applied to the plurality of battery packs being charged. The "type" of battery pack refers to: a) the chemistry or chemical composition of the battery cells contained in the battery pack, e.g., Ni—Cd cells, Li—Ion cells, Ni—MH cells; b) the number, size and output voltage of the cells; c) the electrical coupling between the cells, e.g., parallel or series; and d) the configuration of the casing of the battery pack.

The apparatus includes a housing supporting the plurality of charging stations and a housing base portion defining an interior region in which electrical circuitry of the apparatus is disposed. The base portion houses a microprocessor, a resistor network, and a switching assembly mounted on a printed circuit board. A power supply, which is electrically coupled to the microprocessor, the switching assembly and the resistor network, is also supported within the base portion.

Each charging station or socket assembly includes a wiring harness assembly which has conductive contact plates positioned to contact negative and positive terminals of a battery pack inserted in the charging station and a sensing contact plate to determine the type of battery pack inserted.

Each charging station wiring harness assembly includes a connector which is coupled to a mating connector disposed on the printed circuit board and the EEPROM chip that has stored within it one or more charging algorithms for charging the battery pack type or types designated to be charged in the charging station. The microprocessor is electrically coupled to each of the printed circuit board connectors. When a battery pack is inserted in a charging station for charging, the microprocessor extracts the charging algorithm for the battery, executes the algorithm and appropriately controls the power supply to charge the battery pack in accordance with the charging algorithm.

Additionally, the microprocessor utilizes an electrical feedback control loop which includes monitoring the voltage of each battery pack and the charging current delivered to each battery pack by the power supply utilizing an analog to digital converter. If two or more Li—Ion battery packs are inserted in respective charging stations, after sequentially charging each Li—Ion battery pack until the charging voltage across the pack, $V_{charge}$, is equal to the maximum output voltage of the pack, $V_{max}$, the microprocessor will simultaneously charge all the Li—Ion battery packs until each of the packs are fully charged. To control charging voltage and charging current, the microprocessor generates a 2 bit voltage regulating value and a 4 bit current regulating value. An electrical feed back loop is established between the power supply and the resistor network. The resistor network includes two sets of resistors in parallel with a field effect transistor (MET) coupled in series with each resistor. The FETS are selectively open or closed to charge the effective resistance of the resistor network in the power supply feed back loop. The microprocessor regulating values are input to the resistor network which, in essence, functions as a D/A converter to convert the microprocessor regulating values into a first analog voltage signal for regulating the charging voltage provided to a charging station and a second analog voltage signal for regulating charging current provided to the charging stations.

The switching assembly, comprising a plurality of field effect transistors (FETs) which function as switches, operates under the control of the microprocessor to selectively couple the regulated charging voltage and current of the power supply to one or more of the charging stations. The power supply includes first and second analog input ports for receiving the first and second analog voltage signals from the resistor network.

These and other advantages and features of this invention will be clearly understood through consideration of the following detailed description of the invention in conjunction with the accompanying drawings.

DETAILED DESCRIPTION

Structure of Charging Apparatus

Figures 2, 3:
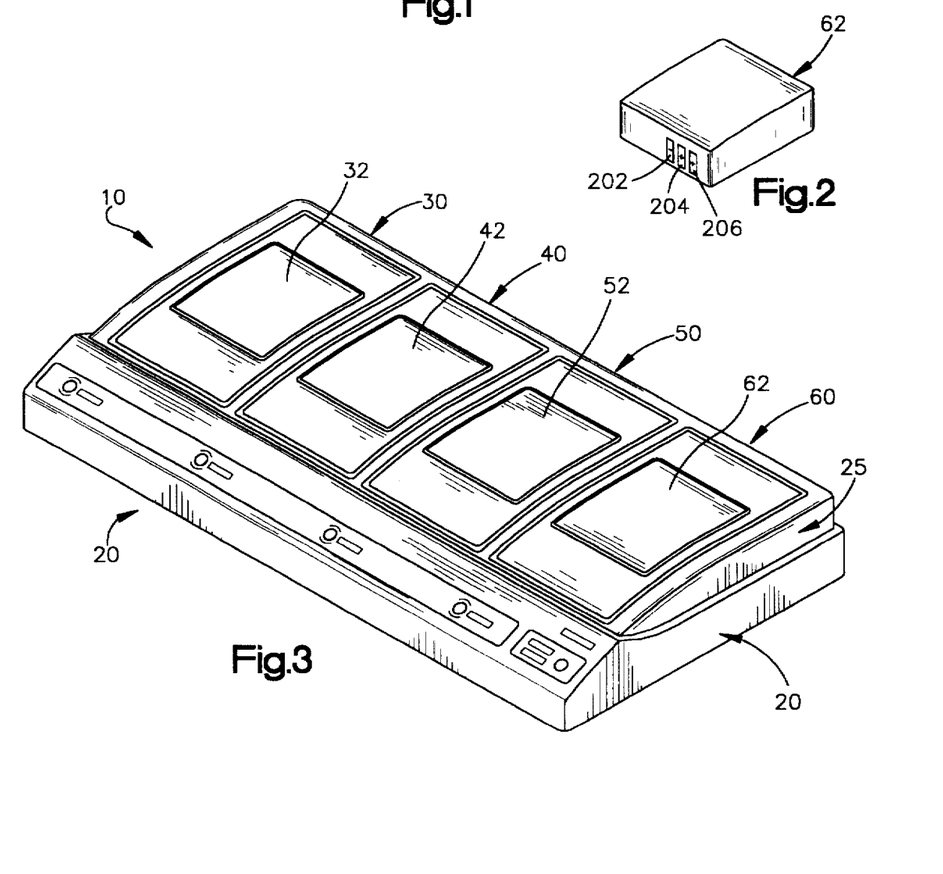
FIG. 2 is a perspective view of a typical Li—Ion or Ni—Cd battery pack.
FIG. 3 is a perspective view of a charging apparatus of the present invention.
Figure 4:
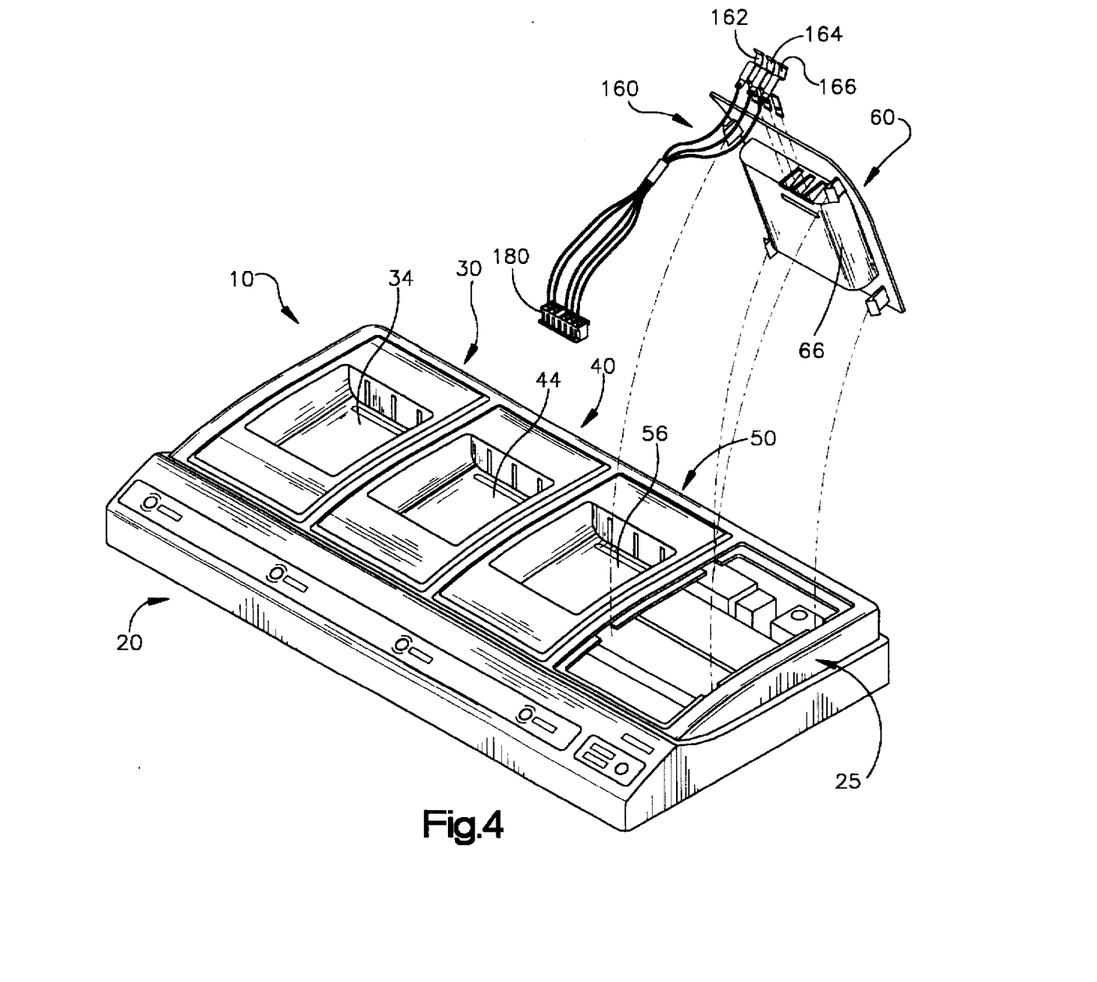
FIG. 4 is another perspective view of a charging apparatus of FIG. 3 with one charging station removed from a housing of the apparatus.
Figure 5:
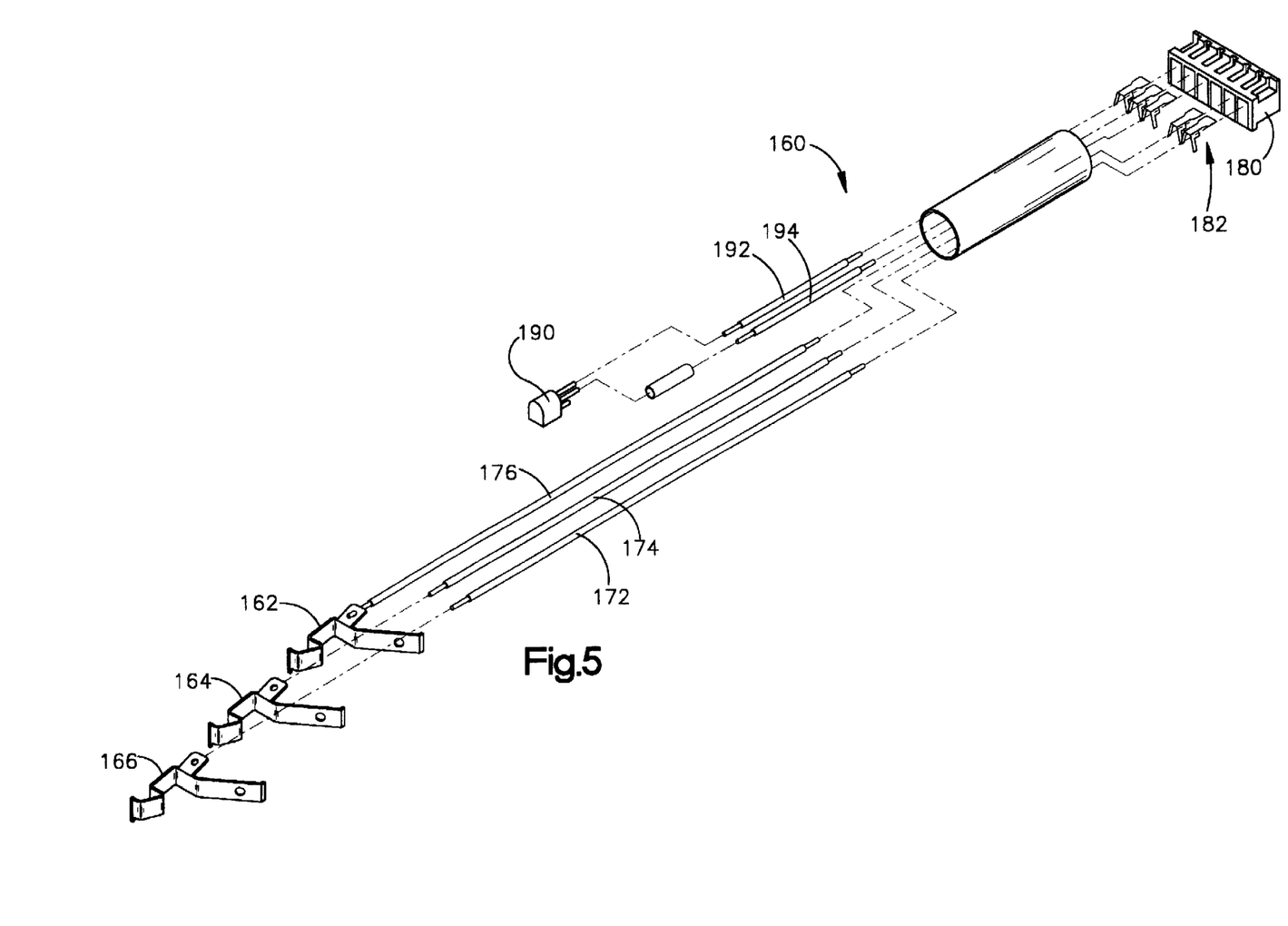
FIG. 5 is a socket assembly of the charging apparatus of FIG. 3.

The charging apparatus of the present invention is shown generally at 10 in FIGS. 3 and 4. The apparatus 10 includes a molded plastic housing 15 including a base portion 20 and an upper portion 25 which extends upwardly from the base portion. The upper portion 25 supports four battery pack charging stations or socket assemblies 30, 40, 50, 60. As can best be seen in FIG. 4, the charging stations 30, 40, 50, 60 are removable from the housing upper portion 25. Each charging station 30, 40, 50, 60 includes a plastic shell 34, 44, 54, 64 which releasably receives a respective Li—Ion or Ni—Cd battery pack 32, 42, 52, 62 in an opening sized to snugly receive a battery pack.

The housing base portion 20 defines an interior region in which electronic circuitry of the charging apparatus 10 is disposed. As is shown schematically in FIG. 6, mounted on a printed circuit board 70 within the housing base portion 20 is a microprocessor 72 which controls charging operations of the apparatus 10. The microprocessor 72 is electrically coupled to a resistor network 74 which is in a feedback loop of a DC power supply 76. The resistor network 74 comprises two sets of parallel resistors each of which is coupled in series to a field effect transistor (FET). Each FET functions as a switch to switch its connected resistor into and out of the network. Thus, the effective resistance values of each of the two sets of resistors may be changed depending on the state of each of the FETs. Thus, the resistor network 74 functions as a digital to analog converter (D/A converter) for converting digital voltage and current control signals generated by the microprocessor 72 to analog values input to analog input ports 76a, 76b of the DC power supply 76 to regulate the charging voltage and the charging current output by the power supply.

Also mounted on the PC board 70 is a switching assembly 75, an analog to digital (A/D) converter 77 and four connectors 80, 82, 84, 86. The switching assembly 75 (FIG. 7) comprises four switches 90, 91, 92, 93 controlled by the microprocessor 72 for selectively applying the regulated charging power generated by the power supply 76 to the charging stations 30, 40, 50, 60. Preferably, the switches 90, 91, 92, 93 comprise field effect transistors (FETs), alternately, relay switches could be used. The housing base portion 20 also supports the DC power supply 76 which supplies DC power to the charging stations 30, 40, 50, 60. The power supply 76 receives power from an external AC power source 78 (120 V AC) through a conventional electrical plug and converts the AC power to DC power.

The regulation of the power supply output voltage and output current is controlled by the microprocessor 72 utilizing the resistor network 74 which is coupled to the power supply 76 via leads 212, 214, 216 (FIGS. 6 and 7) to form the feedback loop. The microprocessor 72 utilizes the A/D converter 77 to monitor the output current of the power supply 74 and the voltage across each battery pack 32, 42, 52, 62 and utilizes the switching assembly 75 to selectively apply the power output from the power supply 76 to one or more of the battery packs 32, 42, 52, 62 inserted in the charging stations 30, 40, 50, 60.

Figure 6:
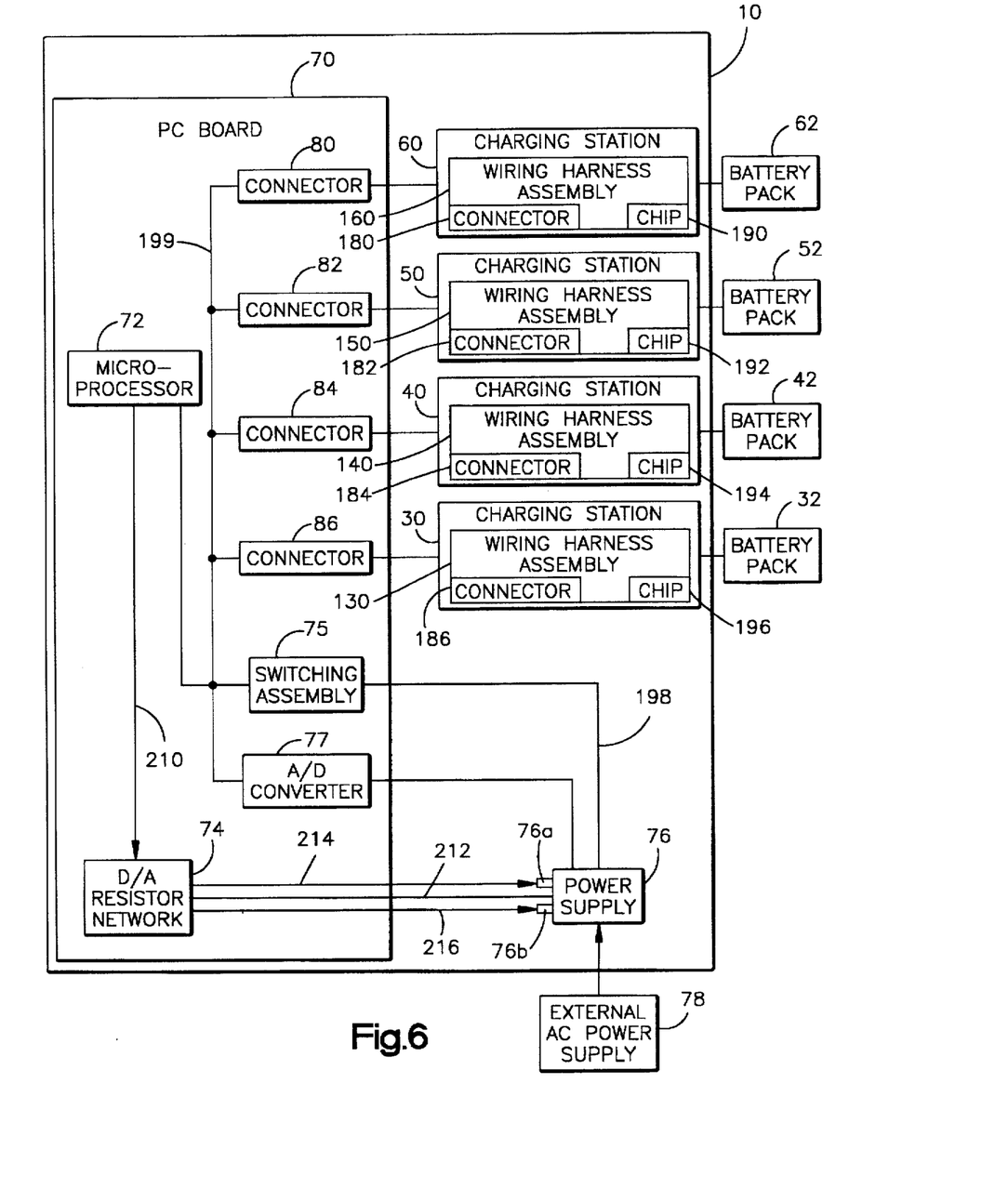
FIG. 6 is a schematic block diagram of selected circuitry of the charging apparatus of FIG. 2.

Associated with each charging station 30, 40, 50, 60 is a respective wiring harness assembly 130, 140, 150, 160 (schematically shown in FIG. 6). One wiring harness assembly 160 is shown in exploded view in FIG. 4 and will be discussed in detail. The remaining wiring harness assemblies 130, 140, 150 are similar in structure and function to the wiring harness assembly 160. The wiring harness assembly 160 provides electrical coupling between the power supply 76 and the battery pack 62 inserted in the charging station shell 66 for charging the battery pack. The wiring harness assembly 160 includes three conductive contact plates 162, 164, 166 which are electrically coupled by respective leads 172, 174, 176 to a connector 180 having a plurality of conductive sockets or contacts 182. The connector 180 is received in a mating connector 80 mounted on the printed circuit board. For the other wiring harness assemblies 130, 140, 150, each has a respective connector 182, 184, 186 (FIG. 6) which is received in mating connectors 82, 84, 86 mounted on the PC board 70.

The wiring harness assembly 160 also includes a memory device comprising an EEPROM integrated circuit chip 190 which is also coupled to the connector 180 via two leads 192, 194. The lead 192 comprises a serial data line, while the lead 194 is a ground line. The chip 190 has stored within it one or more charging algorithms or charging profiles suitable for charging the types of battery pack the charging station 160 will be used in conjunction with. For example, it may be desired to use the charging station 160 to charge a Li—Ion battery pack and a Ni—Cd battery pack. Thus, the EEPROM chip 190 would have two charging algorithms stored therein. One charging algorithm would set forth a suitable charging voltage and a charging current as a function of charging time along with other characteristics for the specific Li—Ion battery pack to be charged. The other charging algorithm would set forth a suitable charging voltage and a charging current as a function of charging time along with other charging characteristics for the specific Ni—Cd battery pack to be charged. It should be appreciated, of course, that if more than one battery pack type is to be charged in the charging station 60, the physical dimensions of the battery pack types and battery pack type terminal-positions 202, 204, 206 must conform to the size of charging station shell opening and the positions of the conductive contact plates in the shell 66 (see FIG. 4).

When the battery pack 62 is inserted in the charging station 60, the wiring harness contact plate 166 is electrically coupled to the positive terminal 206 of the battery pack 62. The wiring harness contact plate 164 is electrically coupled to the battery identification terminal 204 of the battery pack and the wiring harness contact plate 162 is electrically coupled to the negative terminal 202 of the battery pack 62. If the battery pack 62 is a Ni—Cd battery pack, the battery identification terminal 204 will be coupled to the positive terminal 206. Thus, the pack 62 will be identified by the microprocessor 72 as a Ni—Cd pack because of a positive charge on the terminal 204. If no positive charge is sensed by the microprocessor 72 on terminal 204, then the battery pack is identified as a Li—Ion battery pack. When the battery pack 62 is inserted into the battery pack receiving opening of the shell 66, the microprocessor 72 identifies the type of battery pack that has been inserted in the charging station by sensing whether or not the battery pack terminal 202 has a positive charge the microprocessor 72 reads the charging algorithm for the charging station 60 and suitably controls the power supply 76 to charge the battery pack 62 in accordance with the charging station charging algorithm for the sensed type of battery pack. The structure of the other charging stations 30, 40, 50 is identical to the structure of the charging station 60. That is, the other wiring harness assemblies 130, 140, 150 of the charging stations 30, 40, 50 each has a respective EEPROM chip 192, 194, 196 (FIG. 6) which is coupled by leads to the station's wiring harness assembly connector 182, 184, 186. Each EEPROM chip 192, 194, 196 has stored in memory one or more charging algorithms corresponding to the battery pack type or types the charging station will be used to charge.

Operation of the Charging Apparatus

The charging algorithm for an Li—Ion battery pack is as follows:

for the period t=0 to t=$t_{crossover}$, set $I_{charge}=I_{max}$, where:

t=0 is the start of the charging period, $t_{crossover}$ is the time at which the charging voltage applied across the battery pack, $V_{charge}$, rises to the maximum output voltage of the battery pack, $V_{max}$, $I_{charge}$ is the charging current applied to the battery pack, and $I_{max}$ is the maximum charging current the battery pack can receive without harming the pack;

for the period subsequent to t=$t_{crossover}$, set $V_{charge}=V_{max}$ until the pack is fully charged.

The charging algorithm for a Ni—Cd battery pack is as follows:

for the period subsequent to t=0, set $I_{charge}=I_{max}$, where:

$I_{charge}$ is the charging current applied across the battery pack, and $I_{max}$ is the maximum charging current the battery pack can receive without harming the pack.

Figure 8A:
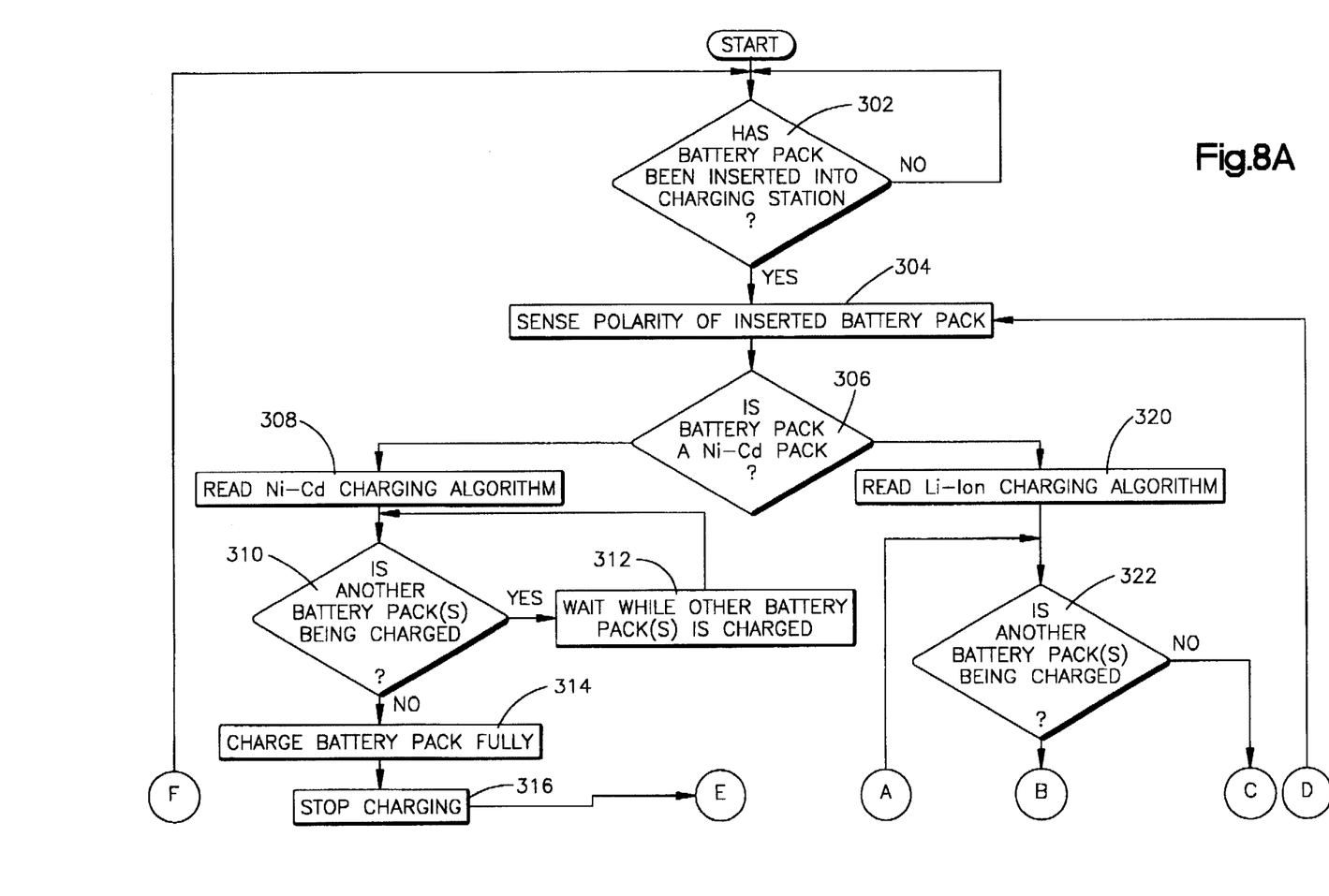
FIG. 8A is a portion of a flowchart setting forth a routine for charging a plurality of rechargeable Li—Ion battery packs utilizing the charging apparatus of FIG. 3.
Figure 8B:
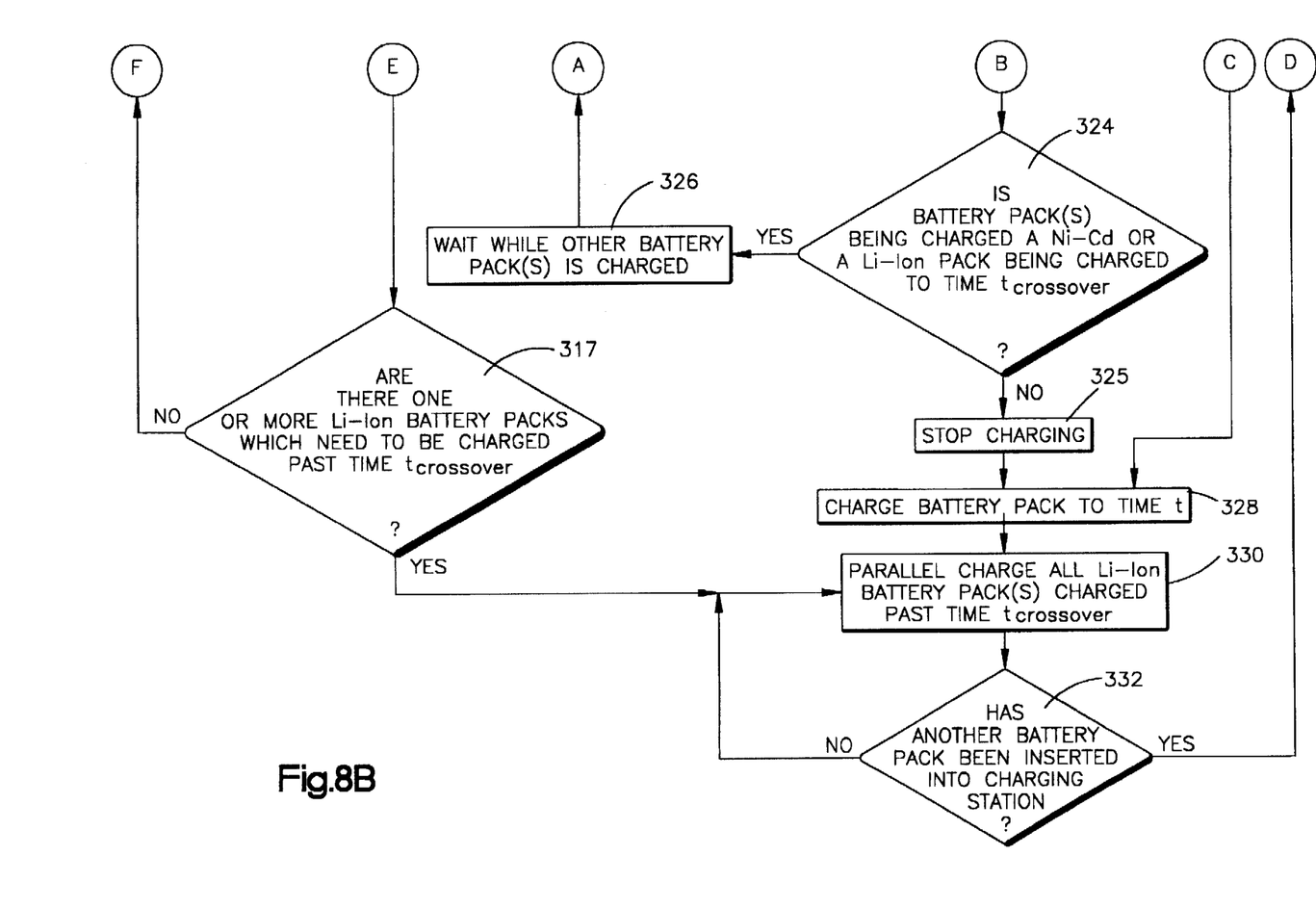
FIG. 8B is the matching portion of the flowchart set forth in FIG. 8A.

FIG. 8 is a flowchart of the charging operation of the apparatus 10 in accordance with the present invention. It will be assumed that each charging station 30, 40, 50, 60 is capable of charging either a Ni—Cd battery pack or a Li—Ion battery pack and that each station's EEPROM chip 196, 194, 192, 190 has stored within it suitable charging algorithms for charging Ni—Cd and Li—Ion battery packs. Basically, the charging apparatus 10 charges battery packs sequentially in the order that the packs are inserted into the charging stations. For a Ni—Cd battery pack, the pack is charged at a charging current $I_{charge}=I_{max}$ to a fully charged condition, that is, $V_{charge}=V_{max}$, the voltage across the battery pack $V_{charge}$ is equal the maximum output voltage of the pack, $V_{max}$.

For a Li—Ion battery pack, an inserted pack is initially charged at a charging current $I_{charge}=I_{max}$ for a time period equal to $t_{crossover}$, which causes the $V_{charge}$ to rise to $V_{max}$. Subsequent to $t_{crossover}$, the Li—Ion pack is charged at a charging voltage $V_{charge}=V_{max}$ in parallel with other Li—Ion packs which have also been charged for a period greater than or equal to time $t_{crossover}$. Obviously, if at a particular time, only one Li—Ion battery pack needs to be charged from time $t=t_{crossover}$ to $t_{fullcharge}$ and no other packs need to be charged, the charging of the single Li—Ion battery pack from time $t=t_{crossover}$ to $t_{fullcharge}$ will not be a "parallel charging" of multiple Li—Ion packs since it is the only pack being charged. For simplicity of description, however, charging of one or more Li—Ion battery packs from time $t=t_{crossover}$ through $t=t_{fullcharge}$ will be termed "parallel charging". The underlying concept is that, whenever possible, Li—Ion battery packs that have been charged up to or past time $t=t_{crossover}$ and are not yet fully charged should be charged in parallel. As an Li—Ion battery pack being charged in parallel reaches full charge, the microprocessor 72 will stop charging that battery pack and continue parallel charging of the remaining packs until the last pack is fully charged. This process will be termed parallel charging even though it is recognized that at times only one Li—Ion pack will actually be receiving charge from the power supply 74.

The parallel charging of Li—Ion battery packs from time $t=t_{crossover}$ to $t=t_{fullcharge}$ reduces the total charging time whenever two or more Li—Ion packs are charged in parallel from time $t_{crossover}$ to $t_{fullcharge}$ as compared to individual sequential charging of each Li—Ion battery pack. The parallel charging takes advantage of the fact that $I_{charge}$ for a Li—Ion battery pack rapidly decreases after time $t_{crossover}$ is passed. Thus, the power supply 74 may be set to output a charging voltage of $V_{charge}=V_{max}$ to two or more Li—Ion packs in parallel without worrying about $I_{charge}$ exceeding $I_{max}$ for any of the parallel charging battery packs. Turning to FIG. 8, at step 302, the processor 72 waits until a battery pack has been inserted into one of the charging stations 30, 40, 50, 60. At steps 304 and 306, the processor 72 determines whether the inserted battery pack is a Ni—Cd battery pack or a Li—Ion battery pack by sensing the polarity of the pack's middle terminal. For example, if the battery pack 62 is inserted or docked in charging station 60, the microprocessor 72 utilizes the conductive contact plate 164 to sense the polarity of the battery pack terminal 204 to see if the inserted pack is a Ni—Cd battery pack or a Li—Ion battery. If the middle terminal 204 of the inserted pack 62 has a positive charge, the pack is a Ni—Cd battery pack. If the middle terminal 204 does not have a positive charge, then the pack 62 is a Li—Ion battery pack.

Assuming that the inserted battery pack 62 is a Ni—Cd battery pack, at step 308, the processor 72 reads a Ni—Cd charging algorithm from the charging station's EEPROM chip 190 and stores the algorithm in a memory associated with the processor. At step 310, the processor 72 determines if another battery pack or battery packs are being charged. If so, at step 312, the processor 72 waits until charging of the currently charging battery pack or battery packs being charged is completed.

When charging of the currently charging battery pack is complete, at step 314, the inserted Ni—Cd battery pack 62 is charged in accordance with the charging algorithm extracted from the EEPROM chip 190. When charging of the Ni—Cd battery pack 62 is complete at step 316, that is, $V_{charge}=V_{max}$ the charging is stopped. The processor, at step 317, determines if there are one or more Li—Ion battery packs which have been charged to $t_{crossover}$ need to be charged in parallel from $t_{crossover}$ to $t_{fullcharge}$. If the processor 72 determines that there are one or more Li—Ion battery packs which need parallel charging, the processor 72 commences parallel charging at step 330. Parallel charging will continue until another battery pack is inserted as shown at step 332.

If, at step 317, the processor 72 determines that there are no Li—Ion battery packs that need parallel charging, the charging process loops back to step 302 where the processor 72 waits for another battery pack to be inserted. If at step 306, the processor 72 determines that the battery pack 62 inserted in the charging station 60 is a Li—Ion battery pack, the processor at step 320 reads a Li—Ion charging algorithm from the charging station's EEPROM chip 190 and stores the algorithm in the memory associated with the processor. At step 322, the processor 72 determines if another battery pack or battery packs is being charged, if so, at step 324 the processor 72 determines if the current battery pack or packs being charged is either of: (1) a Ni—Cd battery pack or (2) a Li—Ion battery pack being charged from time t=0 to $t=t_{crossover}$. If the battery pack being charged is either a Ni—Cd battery pack or an Li—Ion battery pack being charged from t=0 to $t=t_{crossover}$, then, at step 326, the processor 72 waits until charging of the currently charging battery pack is completed.

When charging of the battery pack currently being charged is complete, at step 328, the inserted Li—Ion battery pack is charged to time $t=t_{crossover}$, that is, the pack is charged to $V_{charge=Vmax}$. After the inserted Li—Ion battery pack 62 has been charged for a time $t=t_{crossover}$, then, at step 330, the inserted Li—Ion battery pack 62 is charged in parallel with all other Li—Ion battery packs that have been charged past time $t=t_0$ to $t_{crossover}$ and are not yet fully charged. When a charging Li—Ion pack is fully charged, the processor 72 will stop charging the pack and will continue to charge the remaining Li—Ion battery packs in parallel. At step 332, the microprocessor 72 continues to monitor if another battery pack has been inserted in one of the charging stations 30, 40, 50, 60. If a battery pack has been inserted, the parallel charging of the Li—Ion packs is discontinues and the charging operation loops back to step 304 where the polarity of the newly inserted battery pack is determined. If, at step 332, no new battery pack insertion is sensed, the processor 72 continues the parallel charging until the last Li—Ion battery pack is fully charged. Then, the charging process loops back to step 302 where the microprocessor 72 waits until another battery pack is inserted.

When a battery pack is inserted in a charging station, the microprocessor 72 reads the charging algorithms associated with that station and after determining the type of battery pack inserted, selects or chooses the appropriate charging algorithm for the type of battery pack inserted and generates a four bit digital value for controlling the output current of the power supply 74 and generates a two bit digital value for controlling the output voltage of the power supply. The two and four bit digital values generated by the processor 72 are coupled to the resistor network 74 via a bus 210 (FIGS. 6 and 7) comprising six data lines. The resistor network 74 comprises two sets of resistors whose effective resistance may be varied by switching resistors into or out of the circuit through the network. The microprocessor digital values are utilized to switch FETs coupled to resistors in the resistor network 74 thereby, in effect, switching the resistors into or out of the circuit. The resistor network 74 includes a voltage control portion or set of resistors comprising two parallel branches, each branch having a resistor in series with an FET. The resistor network 74 also includes a current control portion or set of resistors comprising four parallel branches, each branch having a resistor in series with a FET. The two and four bit digital values are translated into respective FETs in the voltage and current control portions being open or closed. Thus, the two and four bit digital values correspond to two effective resistance values in the voltage and current control portions of the resistor network 74. The effective resistive values of the resistor network 74 are in the feedback loop of the power supply 76 comprising leads 212, 214, 216 and thus function to control the output voltage and current of the power supply.

Thus, the power supply 76 provides a regulated voltage and current through a lead 198 (FIGS. 6 and 7) electrically coupled to the switching assembly 75. The microprocessor 72 utilizes the switching assembly 75 to determine which battery pack or packs will be coupled to the power supply 75 and, therefore, be charged. The order that battery packs are charged is in accordance with the charging process discussed in connection with FIG. 8. The magnitude of the charging voltage and charging current conforms to the charging algorithm retrieved from the charging station a battery pack is inserted in. The charging algorithm selected is the algorithm that corresponds to the type of the inserted battery pack.

Figure 7:
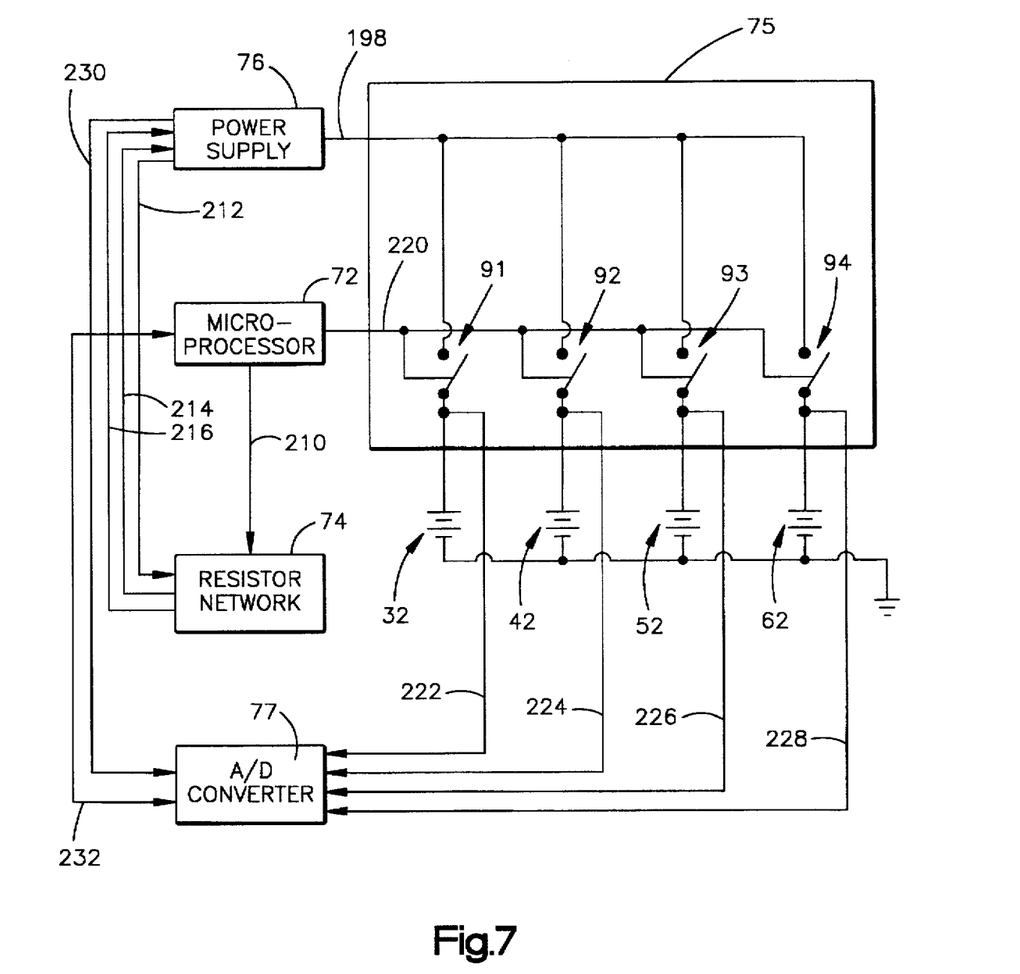
FIG. 7 is a schematic block diagram of a switching assembly of the charging apparatus of FIG. 3.

Turning to FIG. 7, the switching assembly is represented schematically by switches 91, 92, 93, 94. Through a voltage control line 220, (which is part of a bus 199 shown in FIG. 6), the microprocessor 72 selectively opens or closes each switch. When a switch is closed, the battery pack coupled to coupled to the power supply 76 via the lead 198. Referring to FIG. 6, the switches 91, 92, 93, 94 of switching assembly 75 are coupled via a bus 199 to the PC beard connectors 80, 82, 86, 88. Closing a switch of the switching assembly, say switch 91, couples a contact of a selected PC beard connector, say connector 80, to the power supply 76 output. The charging circuit through the battery pack 62 docked in the charging station 60 is completed through contacts 182 of the wiring harness assembly connector 180, wiring harness assembly leads 172, 176 and contact plates 162, 166.

To monitor the charging process so as, for example, to determine when battery pack is fully charged and charging should be terminated or to determine if a battery pack is not accepting a charge and charging should be terminated or to monitor other out of range conditions, the microprocessor 72 utilizes the A/D converter 77. As can be seen in FIG. 7, the A/D converter 77 includes leads 222, 224, 226, 228 (which are part of bus 199) coupled to each of the battery packs 32, 42, 52, 62 to monitor voltage across each pack, $V_{charge}$. The A/D converter 77 is also coupled to via a lead line to the output of the power supply 76 so that the total charging current of the power supply may be monitored. The A/D converter 77 converts the analog voltage and current values to digital values which are coupled to the microprocessor 72 via a lead 232.

Assuming the battery packs 32, 42, 52, 62 are all Li—Ion packs, it should be appreciated that for each charging station 30, 40, 50, 60, prior to the battery pack reaching $t_{crossover}$, the current flow through the pack $I_{charge}$ is limited by the maximum charge, $I_{max}$, set forth in the charging algorithm for the charging station the battery pack is docked at and that after $t_{crossover}$, $I_{charge}$ is limited by the charging impedance of the battery pack.

After all the Li—Ion battery packs have been charged to $V_{max}$, charging all the Li—Ion battery packs in parallel does not increase the total charging time because all the battery packs may be charged at $V_{max}$ and there is no longer a concern about limiting $I_{charge}$ because each Li—Ion battery pack will inherently limit $I_{charge}$ to be less than $I_{max}$ because of the increasing charging impedance of the Li—Ion cells comprising the Li—Ion battery pack.

It should be appreciated that for a typical Li—Ion battery pack, $t_{crossover}$ is reached within 45 minutes of charging but the pack is not fully charged for several more hours. Thus, charging several Li—Ion battery packs in parallel will not significantly increase the overall charging time.

As can be seen in FIG. 3, the charging stations 30, 40, 50, 60 may be removed from the housing upper portion 25 and the wiring harness assembly connectors 180, 182, 184, 186 unplugged from their respective printed circuit board connectors 80, 82, 84, 86 and replaced by charging stations capable of charging different types of battery packs, for example, a Li—Ion or Ni—Cd battery pack having a different size casing or output voltage. The charging stations for such different battery pack types would have a different configuration for the charging station shell opening. The opening would be dimensioned to receive desired battery pack types that the particular charging station would be used with. Further, the EEPROM integrated circuit chip coupled to the charging station's wiring harness assembly would have appropriate charging algorithms for charging the battery pack types that the particular charging station would be used with.

While the present invention has been described with a degree of particularity, it is the intent that the invention include all modifications and alterations from the disclosed design falling within the spirit and scope of the appended claims.

We claim:

1. A battery charging apparatus for charging a plurality of rechargeable battery packs, the apparatus comprising:

a) a housing defining a plurality of charging stations and an interior region supporting apparatus electronics;

b) the apparatus electronics including a power supply and a microprocessor electrically coupled to the power supply and the charging stations, the microprocessor controlling a charging voltage and a charging current supplied to each charging station;

c) each charging station of the plurality of charging stations adapted to receive a rechargeable battery pack, the received battery pack being one of a plurality of battery pack types, each charging station including a memory device and circuitry for electrically coupling a battery pack received in the station to the power supply;

d) the memory device for each charging station having a plurality of charging algorithms stored therein, one charging algorithm being stored for each of the plurality of battery pack types, each of the charging algorithms of the plurality of charging algorithms including values for a charging voltage and a charging current for charging a battery pack type; and e) the apparatus electronics identifying the battery pack type of a battery pack received in a selected one of the plurality of charging stations, reading the plurality of charging algorithms stored in the memory device of the selected one of the plurality of charging stations, selecting one of the plurality of charging algorithms corresponding to the battery pack type of the battery pack received in the selected one of the plurality of charging stations, and generating control signals in accordance with the selected one of the plurality of charging algorithms to control the charging voltage and charging current coupled from the power supply to the battery pack received in the selected one of the plurality of charging stations.

2. The charging apparatus of claim 1 wherein the apparatus electronics includes a resistor network having a variable resistance and being electrically coupled to the power supply in a feedback loop and electrically coupled to the microprocessor, the variable resistance of the resistor network varied by the microprocessor to control the charging voltage and charging current coupled from the power supply to the battery pack inserted in the selected one of the plurality of charging stations.

3. The charging apparatus of claim 1 wherein the apparatus electronics includes a switching assembly including a plurality of switches electrically coupled to the power supply and the microprocessor, each of the plurality of switches electrically coupled to a respective one of the plurality of charging stations and actuatable by the microprocessor to selectively electrically couple each of the plurality of charging stations to the power supply.

4. The charging apparatus of claim 1 wherein the apparatus electronics includes an analog to digital converter electrically coupled to each of the plurality of charging stations and the microprocessor for monitoring an analog voltage magnitude across each battery pack inserted in a respective different one of the plurality of charging stations and for each battery pack generating a digitized voltage magnitude corresponding to the analog voltage magnitude across the battery pack.

5. The charging apparatus of claim 1 wherein for each charging station of the plurality of charging stations, the circuitry for electrically coupling a battery pack inserted in the station to the power supply comprises a wiring harness assembly having positive and negative contact plates positioned to electrically couple respective positive and negative terminals of the battery pack inserted in the charging station to the power supply.

6. The charging apparatus of claim 1 wherein for each charging station of the plurality of charging stations, the memory device comprises an integrated circuit chip.

7. The charging apparatus of claim 6 wherein for each charging station of the plurality of charging stations, the integrated circuit chip is an EEPROM memory chip.

8. A battery charging apparatus for charging a plurality of rechargeable battery packs, the apparatus comprising:

a) a housing defining a plurality of charging stations and an interior region supporting apparatus electronics;

b) the apparatus electronics including a power supply and a microprocessor electrically coupled to the power supply and the charging stations, the microprocessor controlling power supplied to each charging station;

c) each charging station of the plurality of charging stations adapted to receive a rechargeable battery pack, the received battery pack being one of a plurality of battery pack types, each charging station including an electrical connector to electrically couple the battery pack received in the charging station to the power supply;

d) for each charging station, a memory device having a plurality of charging algorithms stored therein, one charging algorithm being stored for each of the plurality of battery pack types, each of the charging algorithms including at least one of a charging voltage value and a charging current value for charging a battery pack type; and e) the apparatus electronics identifying the battery pack type of a battery pack received in a selected one of the plurality of charging stations and reading a charging algorithm of the plurality of charging algorithms corresponding to the battery pack type of the battery pack received in the selected one of the plurality of charging stations, the read charging algorithm being used by the microprocessor to generate control signals to control power supplied by the power supply to the charging station and coupled to the battery pack received in the selected one of the plurality of charging stations.

9. The charging apparatus of claim 8 wherein the apparatus electronics includes a resistor network having a variable resistance and being electrically coupled to the power supply and the microprocessor in a feedback loop, the variable resistance of the resistor network selectively varied by the microprocessor to control the charging voltage and charging current coupled from the power supply to the battery pack inserted in the selected one of the plurality of charging stations.

10. The charging apparatus of claim 8 wherein the apparatus electronics includes a switching assembly including a plurality of switches electrically coupled to the power supply and the microprocessor, each of the plurality of switches electrically coupled to a respective one of the plurality of charging stations and actuatable by the microprocessor to selectively electrically couple each of the plurality of charging stations to the power supply.

11. The charging apparatus of claim 8 wherein the apparatus electronics includes an analog to digital converter electrically coupled to each of the plurality of charging stations and the microprocessor for monitoring an analog voltage magnitude across each battery pack inserted in a respective different one of the plurality of charging stations and for each battery pack generating a digitized voltage magnitude corresponding to the analog voltage magnitude across of the battery packs.

12. The charging apparatus of claim 8 wherein for each charging station of the plurality of charging stations, the circuitry for electrically coupling a battery pack inserted in the station to the power supply comprises a wiring harness assembly having positive and negative contact plates positioned to electrically couple respective positive and negative terminals of the battery pack inserted in the charging station to the power supply.

13. The charging apparatus of claim 8 wherein for each charging station of the plurality of charging stations, the memory device comprises an integrated circuit chip.

14. The charging apparatus of claim 13 wherein for each charging station of the plurality of charging stations, the integrated circuit chip is an EEPROM memory chip.

* * * * *